US012327666B2

(12) United States Patent
Wernars

(10) Patent No.: US 12,327,666 B2
(45) Date of Patent: Jun. 10, 2025

(54) SURGE SUPPRESSOR ARRANGED FOR SUPPRESSING SURGES, A DRIVER COMPRISING A SURGE SUPPRESSOR AS WELL AS A METHOD FOR OPERATING THE SURGE SUPPRESSOR

(71) Applicant: SIGNIFY HOLDING B.V., Eindhoven (NL)

(72) Inventor: Johannes Petrus Wernars, Megen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 167 days.

(21) Appl. No.: 18/015,491

(22) PCT Filed: Jul. 20, 2021

(86) PCT No.: PCT/EP2021/070235
§ 371 (c)(1),
(2) Date: Jan. 10, 2023

(87) PCT Pub. No.: WO2022/018070
PCT Pub. Date: Jan. 27, 2022

(65) Prior Publication Data

US 2023/0238159 A1 Jul. 27, 2023

(30) Foreign Application Priority Data

Jul. 23, 2020 (EP) .................................... 20187441

(51) Int. Cl.
*H01C 7/12* (2006.01)
*H01C 7/102* (2006.01)

(52) U.S. Cl.
CPC ............... *H01C 7/12* (2013.01); *H01C 7/102* (2013.01)

(58) Field of Classification Search
CPC ........ H01C 7/12; H01C 7/102; H01C 7/1013; H02H 9/042; H02H 9/026; H02H 9/04; H02H 7/22; H02H 7/10
USPC .......................................... 361/117–120, 125
See application file for complete search history.

(56) References Cited

U.S. PATENT DOCUMENTS 4,495,459 A * 1/1985 Kresge ............... G01R 31/1236 361/126
5,790,360 A * 8/1998 Ryan ...................... H02H 9/042 361/111
5,914,662 A * 6/1999 Burleigh ................ H02H 9/042 361/111

(Continued)

FOREIGN PATENT DOCUMENTS

CN 105785164 B 2/2019
KR 101303202 B1 9/2013
WO 2014126357 A1 8/2014

*Primary Examiner* — Danny Nguyen

(57) ABSTRACT

A surge suppressor is provided comprising a Metal Oxide Varistor, MOV, connected to a current-conductive track and arranged for suppressing surges present on the current-conductive track. The surge suppressor includes a temperature dependent component thermally coupled to the current-conductive track. An electrical parameter of the temperature dependent component is dependent on temperature and control means is arranged for providing a quantitative measure of a lifespan of said MOV based on fluctuations of the electrical parameter over time.

14 Claims, 2 Drawing Sheets

(56) References Cited

U.S. PATENT DOCUMENTS

| | | | | |
|---|---|---|---|---|
| 6,477,025 | B1 * | 11/2002 | Goldbach | H05K 9/0066 338/21 |
| 10,182,484 | B1 * | 1/2019 | Thornton | H05B 47/24 |
| 11,545,827 | B2 * | 1/2023 | Lu | H02H 9/042 |
| 2016/0161547 | A1 | 6/2016 | Farquhar, III et al. | |
| 2018/0108461 | A1 | 4/2018 | Rostron et al. | |

* cited by examiner

SURGE SUPPRESSOR ARRANGED FOR SUPPRESSING SURGES, A DRIVER COMPRISING A SURGE SUPPRESSOR AS WELL AS A METHOD FOR OPERATING THE SURGE SUPPRESSOR

CROSS-REFERENCE TO PRIOR APPLICATIONS

This application is the U.S. National Phase application under 35 U.S.C. § 371 of International Application No. PCT/EP2021/070235, filed on Jul. 20, 2021, which claims the benefit of European patent application Ser. No. 20/187,441.9, filed on Jul. 23, 2020. These applications are hereby incorporated by reference herein.

A surge suppressor arranged for suppressing surges, a driver comprising a surge suppressor as well as a method for operating the surge suppressor

BACKGROUND

Electric circuits may be subject to surges. In general, a surge is a transient wave of current, voltage or power in an electric circuit. They may be alternately referred to as transients or spikes. A common source for surges are devices that switch power ON and OFF. As a general rule of thumb, the larger the electrical load that is being switched ON and OFF, the larger will be the surge. Modern lighting devices based on Light Emitting Diodes, LEDs, can also create surges in the electric circuit, because they often control the current, and consequently the light output, by simple ON/OFF control. Another root cause for a surge is a lighting strike. A lighting strike can cause a power surge, i.e. a large amount of energy flowing into the electric circuit.

While such surges may be unavoidable and short lived, they can be disruptive to normal operation of components within the electric circuit. In order to prevent the electric components from such sudden surges, a surge suppressor may be employed. A Metal Oxide Varistor, MOV, is an example of such a surge suppressor. An MOV is able to suppress surges by offering a shunt path to the excess voltage or current, thereby directing the surge away from the electric component(s) to be protected.

When an MOV is used for surge protection, the current through the MOV is corresponding to the amplitude of the surge. It is known that an MOV can handle a limited number of surges. Over time, due to wear out of this MOV, the protective function will become less and in the end this component is likely to fail. Therefore, it is desirable to be able to perform maintenance of circuits with surge suppressors before the device or the surge suppressor fails.

SUMMARY

It would be advantageous to achieve an improved surge suppressor comprising an improved Metal Oxide Varistor, MOV. It would further be advantageous to achieve a driver comprising such a surge suppressor as well as a corresponding method.

In a first aspect of the present disclosure, there is presented, a surge suppressor, comprising a Metal Oxide Varistor, MOV, connected to a current-conductive track and arranged for suppressing surges present on said current-conductive track, a temperature dependent component thermally coupled to said current-conductive track, wherein an electrical parameter of said temperature dependent component is dependent on temperature, and control means arranged for providing a quantitative measure of a lifespan of said MOV based on fluctuations of said electrical parameter over time.

A Metal Oxide Varistor, MOV, is an example of a surge suppressor. An MOV is able to suppress surges by offering a shunt path to the excess voltage or current, thereby directing the surge away from the electric component to be protected. As a way of example, other surge suppressors may be used that are able to suppress surges in a similar manner. The invention according to the present disclosure is particularly useful when the surge suppressor being employed has a limited lifespan, i.e. is able to withstand a limited number of surges or a limited magnitude of surges.

The temperature dependent component is arranged to give an indication of occurrence of a surge. It is able to do this by the relation between the magnitude of current and the temperature of the current carrying track. A higher magnitude surge would result in a higher temperature of the current carrying track. The temperature dependent component may directly read the temperature of the current carrying track or alternately, may be arranged to vary a parameter, such as resistance, inductance, or capacitance, of the component. The temperature may then be, indirectly monitored by monitoring the parameter of the component.

The control means may be for example, a microcontroller, or a similar device capable of receiving input values, such as from the temperature dependent component and to provide output instructions to an output component, that may or may not be a part of the surge suppressor. The output could be, for example, an indication that the surge suppressor needs to be replaced. Alternately, the output could be a count of the number of surges. The control means may also be an integrator, that is designed to integrate the magnitude of the surges over a period of time. The magnitude of the surges may be obtained by correlating the output from the temperature dependent component to a magnitude of a surge using a predefined correlation.

The invention proposes a surge counter based on a temperature dependent component. The current carrying track of the MOV will heat because of the surges and this temperature is sensed by the temperature dependent component as proposed in the figures.

When it is possible to count the number of surges and their intensity, this information can be used to initiate preventive maintenance of the driver. This preventive maintenance will increase the uptime of public lighting system.

An important aspect of the invention is a temperature sensor that measures the track temperature. The delta track temperature is corresponding to the peak current in the track. The track temperature can be sensed by mounting a temperature sensitive SMD component on top of this track. This sensitive element can be an NTC or PTC or any other thermal sensitive SMD component.

A less preferable solution involves measuring the current intensity could using a current transformer, but the cost and size of such transformer will increase both the cost and size of the driver.

According to an embodiment, the surge suppressor may be arranged for providing a predetermined threshold, wherein said control means are arranged for providing said quantitative measure of said lifespan of said MOV based on a comparison of said fluctuations of said electrical parameter over time with said provided predetermined threshold.

In a detailed example hereof, the control means comprise a memory having stored thereon a predetermined threshold, wherein a value of said electrical parameter exceeding said predetermined threshold indicates presence of a surge on said current-conductive track. An advantage of such an embodiment is the ability to indicate a possible failure of the surge suppressor based on the magnitude of the surge alone, irrespective of the number of surges already suppressed by the surge suppressor.

In an alternative example, the predetermined threshold may be provided, by the surge suppressor, using a voltage divider. The voltage divider may consist of two resistors connected in series, with the input voltage applied across the resistor pair, for example a stable supply voltage, and the predetermined threshold may then be considered as the voltage reference in between the pair of resistors.

According to an exemplary embodiment, the control means are arranged for counting the number of times that said electrical parameter exceeds said predetermined threshold, thereby providing said quantitative measure of said lifespan. Irrespective of the actual magnitude of the surges that have been suppressed, it is often recommended to replace surge suppressors periodically. This can ensure that the valuable electrical equipment can continue working efficiently. By counting the number of surges experienced, preventive maintenance can be performed effectively. By doing so, the user can eliminate the need to replace the MOV too early and at the same time ensure that MOV can still function well.

In an embodiment, the temperature dependent component is a thermal sensitive Surface Mounted Device, SMD. It may be advantageous to implement the temperature dependent component as an SMD. Doing so, has an effect of utilizing less space on the circuit, thereby allowing for a compact implementation, and at the same time, the SMD is in direct contact with the current carrying track allowing it to monitor the temperature effectively.

According to an embodiment, the temperature dependent component has a negative temperature coefficient. A Negative Temperature Coefficient, NTC, refers to materials that experience a decrease in electrical resistance when their temperature is raised. Such materials may show a relatively rapid decrease with temperature, i.e. a lower coefficient. The lower the coefficient, the greater a decrease in electrical resistance for a given temperature increase. The skilled person understands that a negative temperature coefficient may be associated with other electrical parameters as well, such as inductance or capacitance, for example.

The NTC may be connected to the (analog) input of a microprocessor. This microprocessor takes care of the processing of the data.

According to an embodiment, the control means are arranged for counting the number of times that said electrical parameter falls below said predetermined threshold. This embodiment may be implemented together with the embodiment when the temperature dependent component has a negative temperature coefficient. A surge will result in increase of temperature of the current carrying track. When the temperature increases, the value of an electrical parameter associated with the temperature dependent component will decrease. The device, in collaboration with the control means, may confirm the occurrence of a surge when the parameter falls below a predetermined threshold. Such an embodiment allows for fluctuation of the current within normal operating ranges and eliminates a possibility of false positives.

In an exemplary embodiment, the temperature dependent component has a positive temperature coefficient. A Positive Temperature Coefficient, PTC, refers to materials that experience an increase in electrical resistance when their temperature is raised. Such materials show a relatively rapid increase with temperature, i.e. a higher coefficient. The higher the coefficient, the greater an increase in electrical resistance for a given temperature increase. The skilled person understands that a positive temperature coefficient may be associated with other electrical parameters as well, such as inductance or capacitance, for example.

According to an embodiment, the control means are arranged for counting the number of times that said electrical parameter increases beyond said predetermined threshold. This embodiment may be implemented together with the embodiment when the temperature dependent component has a positive temperature coefficient. A surge will result in increase of temperature of the current carrying track. When the temperature increases, the value of an electrical parameter associated with the temperature dependent component will also increase. The device, in collaboration with the control means, may confirm the occurrence of a surge when the parameter increases above a predetermined threshold. Such an embodiment allows for fluctuation of the current within normal operating ranges and eliminates a possibility of false positives.

In an embodiment, the current-conductive track is a Printed Circuit Board, PCB, track and wherein said temperature dependent component is a Surface Mounted Device, SMD, mounted on top of said PCB track. The device according to the present disclosure may be implemented on PCB, thereby limiting the overall size of the device. This has the advantage that the device according to the present disclosure may be integrated easily and in a compact manner with other devices.

According to an embodiment, the control means comprise a processor for providing said quantitative measure of said lifespan of said MOV. The advantage thereof is that the quantitative measure, i.e. either the number of surges counted or the total magnitude of surges measured may be indicated to an user. Effective maintenance of the surge suppressor may be deployed when the quantitative measure is provided to the user.

In an exemplary embodiment, the temperature dependent component wherein a resistance value of said temperature dependent component is dependent on temperature. As mentioned earlier in the present disclosure, NTC or PTC materials often associate resistance with the temperature. However, this is not limiting. Simple modifications may allow variation of other electrical parameters with temperature.

In a second aspect of the disclosure, there is presented a driver arranged to receive electrical power and provide output electrical power to an electrical load, said driver comprising said surge suppressor according to any of the previously mentioned embodiments, wherein said surge suppressor is arranged to suppress surges to said electrical load.

It is noted that the definitions and advantages associated with the first aspect of the disclosure are also associated with the second aspect of the present disclosure. Additionally it is envisioned that, the surge suppressors may be integrated in existing components such as a driver arranged to drive an electrical load, for example a driver for a Light Emitting Diode, LED, based lighting device.

In a third aspect of the present disclosure, there is presented a method of operating a surge suppressor according to any of embodiments in the first aspect, said method comprising the steps of suppressing an electrical surge, by a Metal Oxide Varistor, MOV, connected to said current-conductive track, providing, by said temperature dependent component, said electrical parameter of said temperature dependent component to said control means, providing, by said control means, said quantitative measure of said lifespan of said MOV based on fluctuations of said electrical parameter over time.

In a fourth aspect of the present disclosure, there is presented, a method of operating a driver according to claim 13, wherein said method comprises the step of counting, by said control means, a number of surges experienced by said surge suppressor.

These and other aspects of the invention will be apparent from and elucidated with reference to the embodiment(s) described hereinafter.

DETAILED DESCRIPTION

Figure 1:
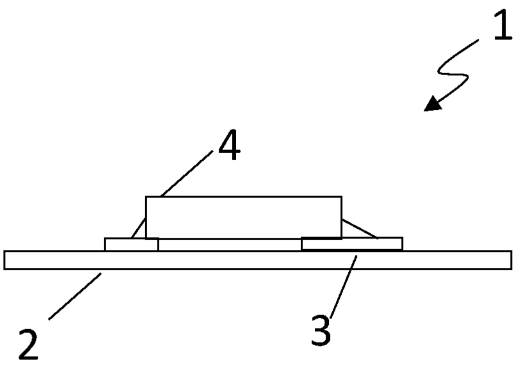
FIG. 1 illustrates a device according to an embodiment of the present disclosure.

FIG. 1 illustrates a device according to an embodiment of the present disclosure. Embodiment 1 illustrates the temperature dependent component 4 mounted on a Printed Circuit Board, PCB, 2. The Temperature sensitive component 4 is in thermal contact with the current carrying track 3.

Figure 2:
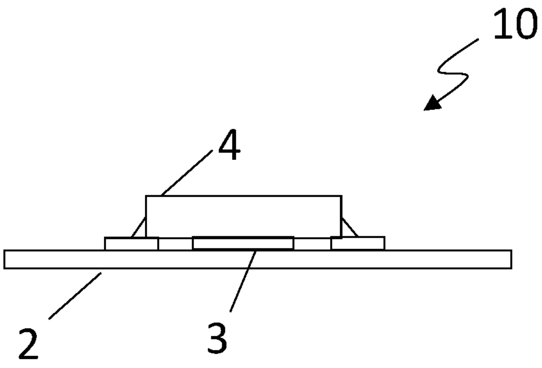
FIG. 2 illustrates a device according to an embodiment of the present disclosure.

FIG. 2 in embodiment 10 illustrates these components in another configuration.

Figure 3:
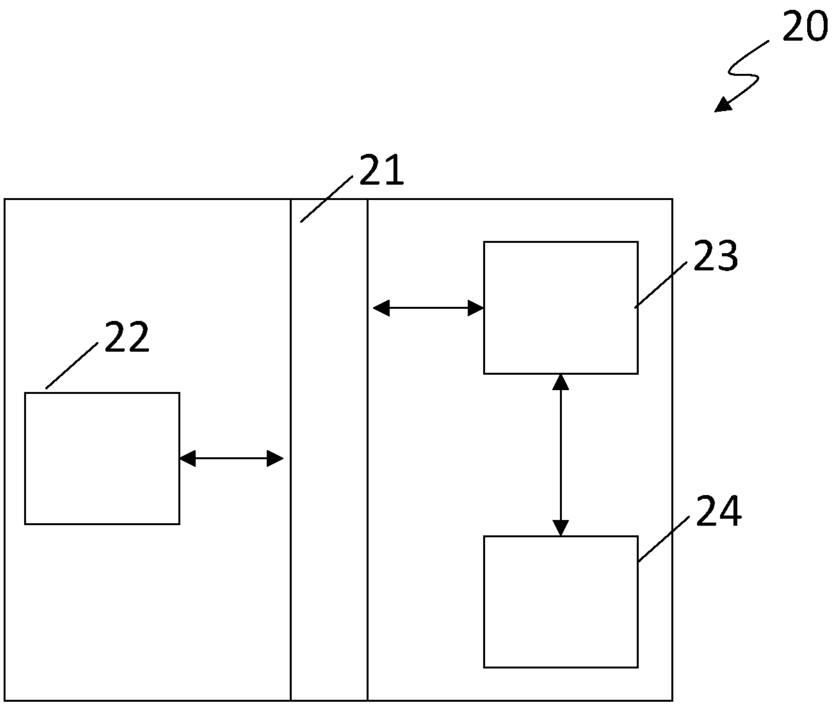
FIG. 3 illustrates a surge suppressor according to the present disclosure.

FIG. 3 illustrates a surge suppressor 20 according to the present disclosure. The surge suppressor 20, comprises a Metal Oxide Varistor, MOV, 22 connected to a current-conductive track 21 and is arranged for suppressing surges present on said current-conductive track 21. The surge suppressor further comprises a temperature dependent component 23 thermally coupled to the current-conductive track 21, wherein an electrical parameter of said temperature dependent component is dependent on temperature.

The surge suppressor 20 also comprises control means 24 arranged for providing a quantitative measure of a lifespan of said MOV based on fluctuations of said electrical parameter over time. The control means is in communication with the temperature dependent component in order to determine/count the number of surges on the current carrying track 21. Additionally the surge suppressor may comprise indicating means (not shown) or other means to connect to an external display device (not shown) which may be arranged to give an indication of the number of surges that have occurred on the current carrying track 21.

Figure 4:
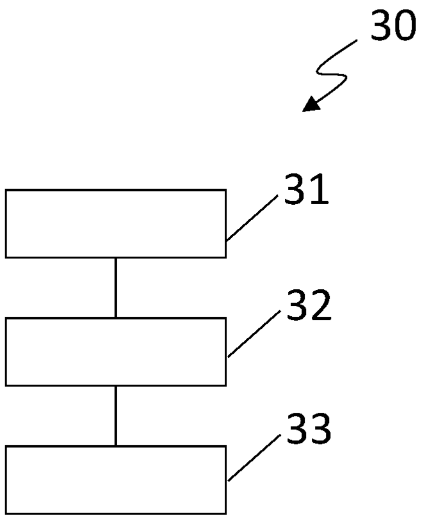
FIG. 4 illustrates a method according to the present disclosure.

FIG. 4 illustrates a method 30 according to the present disclosure. The method 30 comprising the steps of suppressing 31 an electrical surge, by a Metal Oxide Varistor, MOV, connected to said current-conductive track;

providing 32 , by said temperature dependent component, said electrical parameter of said temperature dependent component to said control means;

providing 33, by said control means, said quantitative measure of said lifespan of said MOV based on fluctuations of said electrical parameter over time.

Within the scope of the present disclosure, the term Metal Oxide Varistor, MOV, has been used to refer to a particular type of surge suppressors. The skilled person understands that the teaching of the present disclosure may be equally applicable with suitable modifications to other types of surge suppressors that are used to suppress surges in domestic appliances.

Other variations to the disclosed embodiments can be understood and effected by those skilled in the art in practicing the claimed invention, from a study of the drawings, the disclosure, and the appended claims. In the claims, the word “comprising” does not exclude other elements or steps, and the indefinite article “a” or “an” does not exclude a plurality. A single processor or other unit may fulfil the functions of several items recited in the claims.

The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A surge suppressor, comprising:

a current-conductive track;

a Metal Oxide Varistor (MOV) connected to said current-conductive track and arranged for suppressing surges present on said current-conductive track;

a temperature dependent component thermally coupled to said current- conductive track, wherein an electrical parameter of said temperature dependent component is dependent on a temperature of said current-conductive track;

control means arranged for providing a quantitative measure of a lifespan of said MOV based on fluctuations of said electrical parameter over time.

2. The surge suppressor in accordance with claim 1, wherein said surge suppressor is arranged for providing a predetermined threshold, wherein said control means are arranged for providing said quantitative measure of said lifespan of said MOV based on a comparison of said fluctuations of said electrical parameter over time with said provided predetermined threshold.

3. The surge suppressor in accordance with claim 2, wherein said control means are arranged for counting the number of times that said electrical parameter exceeds said predetermined threshold, thereby providing said quantitative measure of said lifespan.

4. The surge suppressor in accordance with any of the previous claims, wherein said temperature dependent component is a thermal sensitive Surface Mounted Device, SMD.

5. The surge suppressor according to claim 1, wherein said temperature dependent component has a negative temperature coefficient.

6. The surge suppressor according to claim 5, wherein said control means are arranged for counting the number of times that said electrical parameter falls below said predetermined threshold.

7. The surge suppressor according to claim 1, wherein said temperature dependent component has a positive temperature coefficient.

8. The surge suppressor according to claim 7, wherein said control means are arranged for counting the number of times that said electrical parameter increases beyond said predetermined threshold.

9. The surge suppressor according to claim 1, wherein said current-conductive track is a Printed Circuit Board (PCB) track and wherein said temperature dependent component is a Surface Mounted Device (SMD) mounted on top of said PCB track.

10. The surge suppressor according to claim 1, wherein said control means comprise a processor for providing said quantitative measure of said lifespan of said MOV.

11. The surge suppressor according to claim 1, wherein said temperature dependent component wherein a resistance value of said temperature dependent component is dependent on temperature.

12. A driver arranged to receive electrical power and provide output electrical power to an electrical load, said driver comprising said surge suppressor according to claim 1, wherein said surge suppressor is arranged to suppress surges to said electrical load.

13. A method of operating a surge suppressor, said method comprising the steps of:

suppressing an electrical surge, by a Metal Oxide Varistor (MOV) connected to a current-conductive track, present on said current-conductive track;

providing, by a temperature dependent component, an electrical parameter of said temperature dependent component to control means, wherein the electrical parameter of said temperature dependent component is dependent on a temperature of said current-conductive track; and providing, by said control means, a quantitative measure of said lifespan of said MOV based on fluctuations of said electrical parameter over time.

14. The method according to claim 13, wherein said method further comprises the step of:

counting, by said control means, a number of surges experienced by said surge suppressor.

* * * * *